United States Patent
Nagel (10) Patent No.: US 12,330,605 B2
(45) Date of Patent: Jun. 17, 2025

(54) BRAKING FORCE GENERATOR FOR A BRAKING SYSTEM, AND ACTUATION DEVICE FOR A BRAKING SYSTEM

(71) Applicant: Robert Bosch GmbH, Stuttgart (DE)

(72) Inventor: Willi Nagel, Remseck/Hochdorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 331 days.

(21) Appl. No.: 17/793,088

(22) PCT Filed: Jan. 25, 2021

(86) PCT No.: PCT/EP2021/051641
§ 371 (c)(1),
(2) Date: Jul. 15, 2022

(87) PCT Pub. No.: WO2021/209176
PCT Pub. Date: Oct. 21, 2021

(65) Prior Publication Data
US 2023/0039019 A1    Feb. 9, 2023

(30) Foreign Application Priority Data
Apr. 17, 2020 (DE) ...................... 10 2020 204 885.1

(51) Int. Cl.
*B60T 13/74* (2006.01)
*F16D 65/28* (2006.01)
(Continued)

(52) U.S. Cl.
CPC ............ *B60T 13/745* (2013.01); *F16D 65/28* (2013.01); *F16D 2121/24* (2013.01); *F16D 2125/06* (2013.01); *F16D 2125/50* (2013.01)

(58) Field of Classification Search
CPC ................. F16D 65/28; F16D 2121/24; F16D 2125/06; F16D 2125/50; B60T 13/745;
(Continued)

(56) References Cited

U.S. PATENT DOCUMENTS

| 6,412,610 B1 | 7/2002 | Drennen et al. |
| 2004/0192485 A1 | 9/2004 | Severinsson |

(Continued)

FOREIGN PATENT DOCUMENTS

| CN | 103562058 A | 2/2014 |
| CN | 104114900 A | 10/2014 |

(Continued)

OTHER PUBLICATIONS

Machine translation of JP 2007-098969 (no date).*
International Search Report for PCT/EP2021/051641, Issued May 17, 2021.

*Primary Examiner* — Nicholas J Lane
(74) *Attorney, Agent, or Firm* — NORTON ROSE FULBRIGHT US LLP (57) ABSTRACT

A brake force generator for a brake system. The brake force generator includes a driveshaft rotatably mounted in a housing, an electric motor, a displaceably mounted actuating element, and a transmission device that acts between the driveshaft and the actuating element in such a way that when there is a rotation of the driveshaft the actuating element is displaced. The transmission device has a planetary gear mechanism that has a sun gear connected in rotationally fixed fashion to the driveshaft, a rotatably mounted planet carrier, and at least one planet gear that is rotatably mounted on the planet carrier by a planet gear shaft. The planet carrier has a hollow shaft segment, and a jacket wall of the hollow shaft segment having a radial through-opening in which the planet gear lies. The planet gear shaft is mounted in the hollow shaft segment at both sides of the planet gear.

11 Claims, 4 Drawing Sheets

(51) Int. Cl.
 *F16D 121/24* (2012.01)
 *F16D 125/06* (2012.01)
 *F16D 125/50* (2012.01)

(58) Field of Classification Search
 CPC ............. F16H 2001/28; F16H 2001/32; F16H 57/082
 See application file for complete search history.

(56) References Cited

U.S. PATENT DOCUMENTS

| | | |
|---|---|---|
| 2005/0247528 A1 | 11/2005 | Schack et al. |
| 2010/0313408 A1* | 12/2010 | Morlo ................ B21K 25/00 29/525.01 |
| 2015/0330467 A1* | 11/2015 | Bourlon ............ B60T 13/745 475/149 |
| 2017/0002882 A1 | 1/2017 | Gutelius |
| 2019/0084544 A1 | 3/2019 | Severinsson et al. |
| 2019/0093750 A1 | 3/2019 | Matsuto et al. |
| 2020/0062231 A1 | 2/2020 | Micke |
| 2022/0213947 A1* | 7/2022 | Isobe ...................... F16H 57/08 |

FOREIGN PATENT DOCUMENTS

| | | |
|---|---|---|
| DE | 102011107012 A1 | 1/2013 |
| EP | 3412926 A1 | 12/2018 |
| JP | 2007098969 A | 4/2007 |
| JP | 2017203553 A | 11/2017 |
| JP | 2018017392 A | 2/2018 |
| JP | 2020008134 A | 1/2020 |
| WO | 2019131616 A1 | 7/2019 |

\* cited by examiner

BRAKING FORCE GENERATOR FOR A BRAKING SYSTEM, AND ACTUATION DEVICE FOR A BRAKING SYSTEM

FIELD

The present invention relates to a brake force generator for a brake system, having a driveshaft that is rotatably mounted in a housing of the brake force generator, an electric motor that has a rotor and at least one motor winding, the rotor being situated in rotationally fixed fashion on the driveshaft and being rotatable through an application of current to the motor winding, and an actuating element that is displaceably mounted, and having a transmission device that acts between the driveshaft and the actuating element in such a way that the actuating element is displaced when there is a rotation of the driveshaft, the transmission device having a planetary gear mechanism that has a sun gear connected in rotationally fixed fashion to the driveshaft, a planet carrier mounted in rotatable fashion, and at least one planet gear that is rotatably mounted on the planet carrier by a planet gear shaft.

Moreover, the present invention relates to an actuating device having a brake force generator of the type mentioned above.

BACKGROUND INFORMATION

A hydraulic brake system of a motor vehicle standardly has at least one friction brake device. To actuate the friction brake device, the brake system standardly has an actuating device having a master brake cylinder in which at least one hydraulic piston is displaceably mounted. The master brake cylinder is fluidically connected to a slave cylinder of the friction brake device. In order to actuate the friction brake device, the hydraulic cylinder is displaced in such a way that a hydraulic fluid is displaced from the master brake cylinder into the slave cylinder.

More and more frequently, in automotive engineering actuating devices are installed having a brake force generator that enables an electromotoric displacement of the hydraulic piston, and thus an electromotoric actuation of the friction brake device. For example, actuating devices of the iBooster type by applicant have such a brake force generator. The brake force generator has a driveshaft that is rotatably mounted in a housing of the brake force generator. In addition, the brake force generator has an electric motor that has a rotor and at least one, in particular multi-phase, motor winding. The rotor is situated in rotationally fixed fashion on the driveshaft and is rotatable through a suitable application of current to the motor winding, the driveshaft then being rotated conjointly with the rotor. The motor winding is for example a stator winding fixed to the housing, or a rotor winding that rotates with the rotor.

Moreover, the brake force generator has an actuating element that is displaceably mounted. In addition, a transmission device is provided that acts between the driveshaft and the actuating element in such a way that the actuating element is displaced when there is a rotation of the driveshaft. Thus, the transmission device is designed to convert a rotational motion of the driveshaft into a translational motion of the actuating element. For this purpose, the transmission device standardly has a planetary gear mechanism that has a sun gear connected in rotationally fixed fashion to the driveshaft, a rotatably mounted planet carrier, and at least one planet gear that is rotatably mounted on the planet carrier by a planet gear shaft.

SUMMARY

A brake force generator according to the present invention may have the advantage that a particularly stable mounting of the planet gear on the planet carrier is ensured. According to an example embodiment of the present invention, for this purpose, it is provided that the planet carrier has a hollow shaft segment, a jacket wall of the hollow shaft segment having a radial through-opening in which the planet gear lies, and the planet gear shaft being mounted in the hollow shaft segment on both sides of the planet gear. Differing from the solution according to the present invention, from the existing art it is conventional to mount the planet gear shaft on one side at an end face of the planet gear carrier. Preferably, the planetary gear mechanism has a plurality of planet gears that are rotatably mounted on the planet carrier by a different planet gear shaft in each case, the jacket wall of the hollow shaft segment having a radial through-opening for each of the planet gears. Particularly preferably, the planet gears are rotatably mounted on the planet carrier in a manner uniformly distributed in the circumferential direction of the planet carrier. Preferably, the driveshaft and the planet carrier are mounted so as to be rotatable about the same axis of rotation. When, in the present disclosure, the terms "axial" or "radial" are used, these relate to this axis of rotation, unless some other relation is explicitly named. Preferably, the actuating element is mounted so as to be axially displaceable. The actuating element is thus displaceable along the axis of rotation or along an axis that runs parallel to the axis of rotation and radially at a distance from the axis of rotation. According to the present invention, the planet gear lies in a radial through-opening of the jacket wall of the hollow shaft segment. Correspondingly, the planet carrier extends axially past the planet gear at both sides. Preferably, the planet gear extends radially outwardly past the jacket wall, a toothing of the planet gear meshing with a toothing of a hollow gear of the planetary gear mechanism that is in particular fixed to the housing.

In accordance with an example embodiment of the present invention, preferably, the planet carrier is made of plastic. In this way, the planet carrier can be produced at low cost. Because the planet gear shaft is mounted on both sides of the planet gear, adequate stability of the planetary gear mechanism is nonetheless insured. A costly planet carrier made of metal, as known from the existing art, is not necessary. The planet gear shaft is preferably made of metal. Particularly preferably, the planet carrier is produced as an injection-molded part, i.e. by injection molding. In this way, complex shapes can also be produced in a technically simple manner.

According to a preferred specific embodiment of the present invention, it is provided that the planet gear shaft is connected in rotationally fixed fashion to the planet carrier, or that the planet gear shaft is connected in rotationally fixed fashion to the planet gear. If the planet gear shaft is connected in rotationally fixed fashion to the planet carrier, then wear of the planet carrier and of the planet gear shaft in the area of contact between the planet gear shaft and the planet carrier is low. A rotationally fixed connection of the planet gear shaft to the planet carrier can also be understood as a mounting of the planet gear shaft in the planet carrier, or in the hollow shaft segment. In this case, the planet gear shaft and the planet gear are than usefully rotatable relative to one another. If the planet gear shaft is connected in rotationally fixed fashion to the planet gear, then wear of the planet gear and of the planet gear shaft in the contact area between the planet gear and the planet gear shaft is low. In this case, the planet gear shaft and the planet carrier are usefully rotatable relative to one another.

In accordance with an example embodiment of the present invention, preferably, the hollow shaft segment has a first bearing segment and a second bearing segment, the radial through-opening running axially between the bearing segments, the first bearing segment having an axial through-opening, the second bearing segment having an axial recess, and the planet gear shaft being mounted both in the axial through-opening and in the axial recess. The mounting of the planet gear shaft in the axial through-opening and in the axial recess results in a particularly stable mounting of the planet gear shaft in the hollow shaft segment. In addition, a simple assembly of the planet gear to the planet carrier is possible. For this purpose, preferably the planet gear is first placed into the radial through-opening. Subsequently, the planet gear shaft is inserted through the axial through-opening and through a central opening of the planet gear and into the axial recess. Preferably, the inserted planet gear shaft is connected in rotationally fixed fashion to the planet carrier by a press fit that acts between the planet gear shaft on the one hand and the axial recess on the other hand and/or by a press fit that acts between the planet gear shaft on the one hand and the axial through-opening on the other hand. Preferably, the axial through-opening and the axial recess are aligned with one another. The axial through-opening and the axial recess thus form a blind hole bore that extends through the first bearing segment and ends in the second bearing segment.

In accordance with an example embodiment of the present invention, preferably, the first bearing segment having the axial through-opening is situated closer to the electric motor than is the second bearing segment.

In accordance with an example embodiment of the present invention, preferably, the planet gear shaft is axially fixed by hot stamping. The hot stamping brings about a stable positive-fit connection between the planet gear shaft and the first bearing segment.

In accordance with an example embodiment of the present invention, preferably, the brake force generator has a first bearing that transmits a radial force, the hollow shaft segment lying radially from the inside or radially from the outside on a first bearing ring of the first bearing. This achieves a stable bearing of the planet carrier in the region of the hollow shaft segment. Preferably, the hollow shaft segment is fixedly connected to the first bearing ring of the first bearing. If the hollow shaft segment lies radially from the outside on the first bearing ring of the first bearing, then the hollow shaft segment, or the jacket wall, surrounds the first bearing. This provides the advantage that a small and therefore low-cost bearing can be used as the first bearing.

According to a preferred specific example embodiment of the present invention, it is provided that the first bearing is situated on a side of the planet gear facing the electric motor.

The first bearing is thus situated in a region between the electric motor and the planet gear. This region is easily accessible for assembly, and is thus particularly suitable for the situation of the first bearing.

In accordance with an example embodiment of the present invention, preferably, the brake force generator has a bearing shield fixed to the housing that lies radially from the inside or radially from the outside on a second bearing ring of the first bearing. This brings about a stable supporting of the second bearing ring of the first bearing on the housing of the brake force generator. Usefully, the first bearing ring of the first bearing and the second bearing ring of the first bearing are rotatable relative to one another. In order to reduce friction between the first bearing ring of the first bearing and the second bearing ring of the first bearing, a plurality of roller elements, or a sliding medium, is preferably situated between the bearing rings. Preferably, the second bearing ring is fixedly connected to the bearing shield. Preferably, the bearing shield lies radially from the outside on the second bearing ring of the first bearing if the hollow shaft segment lies radially from the inside on the first bearing ring of the first bearing. Preferably, the bearing shield lies radially from the inside on the second bearing ring of the first bearing if the hollow shaft segment lies radially from the outside on the first bearing ring of the first bearing.

According to a preferred specific example embodiment of the present invention, it is provided that the first bearing ring has a first axial projection, the hollow shaft segment lying radially from the outside on the first axial projection, and/or that the second bearing ring has a second axial projection, the bearing shield lying radially from the outside on the second axial projection. Here, an axial projection is to be understood as a part of the first bearing ring, or of the second bearing ring, that extends axially past the other bearing ring, or the other bearing rings, of the first bearing. If the first bearing ring has the first axial projection, then the first bearing ring can also be contacted radially from the outside by the hollow shaft segment even if the first bearing ring does not form the outermost bearing ring of the first bearing. If the second bearing ring has the second axial projection, then the second bearing ring can also be contacted radially from the outside by the bearing shield even if the second bearing ring does not form the outermost bearing ring of the first bearing.

In accordance with an example embodiment of the present invention, preferably, the driveshaft is rotatably mounted by the first bearing. Because the driveshaft is also rotatably mounted by the first bearing, the number of bearings required for the rotatable bearing of the driveshaft and of the planet carrier is low. This saves components and constructive space.

According to a preferred specific embodiment of the present invention, it is provided that the driveshaft lies radially from the inside on a third bearing ring of the first bearing. Preferably, a sliding medium or a plurality of roller elements are also situated between the third bearing ring of the first bearing and the adjoining bearing ring, i.e. the first bearing ring or the second bearing ring of the first bearing. Preferably, the third bearing ring is fixedly connected to the driveshaft.

Alternatively, the driveshaft preferably lies radially from the inside on the first or on the second bearing ring of the first bearing. The first bearing then has only two bearing rings, namely the first bearing ring and the second bearing ring. So that the driveshaft, the planet carrier, and the bearing shield will be rotatable relative to one another, the driveshaft preferably lies radially from the inside, via a sliding medium or via a plurality of roller elements, on the first bearing ring or on the second bearing ring of the first bearing.

In accordance with an example embodiment of the present invention, preferably, the brake force generator has a second bearing that transmits a radial force, the driveshaft lying radially from the inside on a first bearing ring of the second bearing. The driveshaft is thus rotatably mounted by a different bearing than is the planet carrier. This provides the advantage that the second bearing, bearing the driveshaft, can be situated deliberately at a location that is particularly advantageous for the bearing of the driveshaft.

According to a preferred specific embodiment of the present invention, it is provided that the bearing shield on the one hand lies radially from the outside on a second bearing ring of the second bearing, and on the other hand lies radially from the inside on the second bearing ring of the first bearing. Thus, only a single bearing shield is necessary for the contacting of the bearing rings, fixed to the housing, of the first bearing and of the second bearing.

The actuating device according to the present invention for brake system has a master brake cylinder in which a hydraulic piston is displaceably mounted, and includes the actuating device according to the present invention, the hydraulic piston being displaceable by a displacement of the actuating element. The advantages named above also result from this. Further preferred features and combinations of features result from the above disclosure herein. Preferably, the hydraulic piston is axially displaceable. The hydraulic piston is thus displaceable along the axis of rotation or along an axis that runs parallel to the axis of rotation and radially at a distance from the axis of rotation. Preferably, during the displacement of the hydraulic piston the actuating element lies indirectly on the hydraulic piston. Thus, at least one further displaceable element is present between the actuating element and the hydraulic piston. Alternatively, during the displacement of the hydraulic piston the actuating element lies immediately, i.e. directly, on the hydraulic piston.

In the following, the present invention is explained in more detail on the basis of the figures.

DETAILED DESCRIPTION OF EXAMPLE EMBODIMENTS

Figure 1:
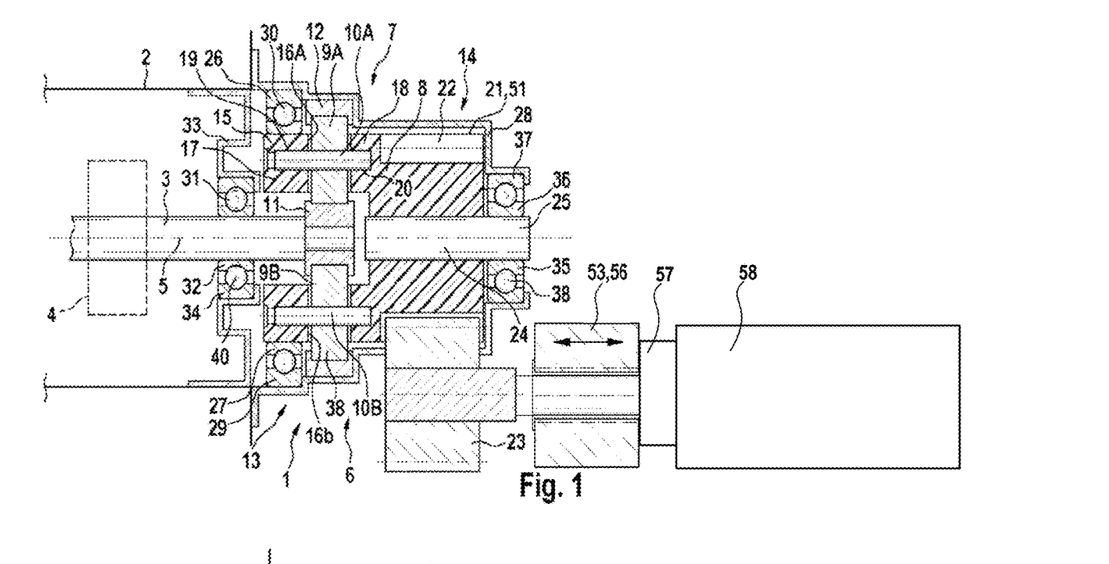
FIG. 1 shows a first exemplary embodiment of a brake force generator of an actuating device of a brake system, according to the present invention.

FIG. 1 shows a first exemplary embodiment of a brake force generator 1 of an actuating device (not shown) of a hydraulic brake system. The hydraulic brake system has a plurality of friction brake devices. The actuating device is designed to actuate the friction brake devices in order to produce a frictional braking torque using the friction brake devices. For this purpose, the actuating device has a master brake cylinder in which at least one hydraulic piston is displaceably mounted. As a rule, the master brake cylinder is a tandem master brake cylinder, so that two hydraulic pistons are standardly displaceably mounted in the master brake cylinder. The master brake cylinder is fluidically connected to slave cylinders of the friction brake devices. When the hydraulic pistons are displaced in a direction of actuation, a hydraulic fluid is displaced from the master brake cylinder into the slave cylinders, and a frictional braking torque is produced.

Actuating device 1 is designed to electromotorically displace the hydraulic pistons and thus to electromotorically actuate the friction brake devices. Such a design is known from actuating devices of the type of applicant's iBooster.

Actuating device 1 has a housing 2 in which a driveshaft 3 is rotatably mounted. Driveshaft 3 is mounted so as to be rotatable about an axis 5 of rotation. Actuating device 1 also has an electric motor 4 (shown only schematically). Electric motor 4 has a rotor and a multiphase motor winding. The rotor is situated in rotationally fixed fashion on driveshaft 3 and is rotatable through an application of current to the motor winding, whereupon driveshaft 3 then rotates conjointly with the rotor. The motor winding is for example a stator winding that is fixedly connected to the housing and that is situated in distributed fashion around the rotor.

Moreover, actuating device 1 has an actuating element 53, which can take the form of, for example, a threaded nut 56 that is displaceably mounted axially along an axis that runs parallel to axis of rotation 5 and radially at a distance from axis of rotation 5. Alternatively, the actuating element can be arranged along axis of rotation 5.

Actuating device 1 also has a transmission device 6 that acts between driveshaft 3 and the actuating element in such a way that the actuating element 53 is axially displaced when there is a rotation of driveshaft 3. The actuating element 53 is coupled to hydraulic piston 57 of a master brake cylinder 58 in such a way that the hydraulic piston 57 is displaced along with the actuating element 53 when the actuating element 53 is displaced in the direction of actuation.

Transmission device 6 has a planetary gear mechanism 7. Planetary gear mechanism 7 has a sun gear 11 that is connected in rotationally fixed fashion to driveshaft 3. Moreover, planetary gear mechanism 7 has a planet carrier 8 that is mounted so as to be rotatable about axis of rotation 5. In addition, planetary gear mechanism 7 has a plurality of planet gears that are rotatably mounted on planet carrier 8 and whose toothings mesh with a toothing of sun gear 11. In the present case, a first planet gear 9A, a second planet gear 9B, and a third planet gear are present, only first planet gear 9A and second planet gear 9B being visible. First planet gear 9A is rotatably mounted on planet carrier 8 by a metallic first planet gear shaft 10A. Second planet gear 9B is rotatably mounted on planet carrier 8 by a metallic second planet gear shaft 10B. The third planet gear (not shown) is mounted rotatably on planet carrier 8 by a metallic third planet gear shaft (not shown). When, in the following, the constructive design of one of the planet gears or the constructive design of one of the planet gear shafts is described, this constructive design is also realized in the other planet gears or, respectively, the other planet gear shafts. In addition, planetary gear mechanism 7 has a hollow gear 12 fixed to the housing, the toothings of the planet gears also meshing with a toothing of hollow gear 12.

Planet carrier 8 is produced as an injection-molded part, i.e. is produced from plastic by injection molding. Planet carrier 8 has a first end region 13 facing electric motor 4 and a second end region 14 facing away from electric motor 4.

First end region 13 is designed as hollow shaft segment 13. In this way, end region 13 is realized with a cylindrical shape. A jacket wall 15 of hollow shaft segment 13 has a number of radial through-openings corresponding to the number of planet gears. One of the radial through-openings is respectively assigned to each of the planet gears, and the planet gears lie in the radial through-openings. For example, first planet gear 9A lies in a first radial through-opening 16A. Second planet gear 9B lies in a second radial through-opening 16B.

The planet gear shafts are mounted on both sides of the planet gears in hollow shaft segment 13. In the following, this is explained in more detail with reference to first planet gear shaft 10A. Hollow shaft segment 13 has a first bearing segment 17 and a second bearing segment 18. First bearing segment 17 has an axial through-opening 19. Second bearing segment 18 has an axial recess 20 that aligns with axial through-opening 19. First planet gear shaft 10A is mounted both in axial through-opening 19 and in axial recess 20. First planet gear shaft 10A is fixedly connected, preferably by a press fit, to planet carrier 8 in the region of axial through-opening 19 and in the region of axial recess 20. In order to mount first planet gear 9A, first the first planet gear 9A is placed into radial through-opening 16A. Subsequently, planet gear shaft 10A is inserted through axial through-opening 19 and through a central opening of first planet gear 9A, and is inserted into axial recess 20 until a front end, in the direction of insertion, of planet gear shaft 10A lies axially on a floor of axial recess 20. Here, planet gear shaft 10A is dimensioned such that in the inserted state of planet gear shaft 10A a rear region, in the direction of insertion, of axial through-opening 19 is free of planet gear shaft 10A. In order to axially fix planet gear shaft 10A, this region of axial through-opening 19 is reshaped by hot stamping. In the present case, first bearing segment 17 is placed closer to electric motor 4 than is second bearing segment 18.

Second end region 14, facing away from electric motor 4, of planet carrier 8 has a jacket wall 21 in which a driven toothing 22, i.e. a gear output of planetary gear mechanism 7, is fashioned. Planet carrier 8, made of plastic, thus has driven toothing 22. According to the exemplary embodiment shown in FIG. 1, jacket wall 21 is a jacket outer wall 51 of second end region 14 of planet bearer 8.

According to the exemplary embodiment shown in FIG. 1, transition device 6 has a further gearing element 23, namely a gear 23, whose toothing meshes with the driven toothing 22. Accordingly, at least one further gearing element of transmission device 6 acts between driven toothing 22 and the actuating element (not shown). If the actuating element were shown, a toothing of the actuating element would for example mesh with the toothing of gear 23. Alternatively, at least one further gear element, such as a threaded nut, would be present between gear 23 and the actuating element. An anti-rotation device would in addition be assigned to the actuating element in order to prevent rotation of the actuating element.

According to the exemplary embodiment shown in FIG. 1, planet carrier 8 is injected onto a metallic carrier rod 24 in order to increase the stability of planet carrier 8. Carrier rod 24 extends in the present case through second end region 14 of planet carrier 8. An end 25, facing away from electric motor 4, of carrier rod 24 is free of planet carrier 8, which is made of plastic.

Brake force generator 1 also has a first bearing 26 that transmits a radial force. First bearing 26 is situated between the planet gears on the one hand and electric motor 4 on the other hand. Hollow shaft segment 13 lies radially from the inside on a first bearing ring 27 of first bearing 26. A first bearing shield 28, fixed to the housing, lies radially from the outside on a second bearing ring 29 of first bearing 26. A plurality of roller elements 30 are situated between first bearing ring 27 and second bearing ring 29. In this way, first bearing 26, according to the exemplary embodiment shown in FIG. 1, is fashioned as roller bearing 26. First bearing ring 27 here forms the inner bearing ring of first bearing 26, and second bearing ring 29 forms the outer bearing ring of first bearing 26.

Brake force generator 1 also has a second bearing 31 that transmits a radial force. Second bearing 31 is situated between first bearing 26 on the one hand and electric motor 4 on the other hand. Driveshaft 3 lies radially from the inside on a first bearing ring 32 of second bearing 31. A second bearing shield 33, fixed to the housing, lies radially from the outside on a second bearing ring 34 of second bearing 31. A plurality of roller elements 40 are situated between first bearing ring 32 and second bearing ring 34. In this way, according to the exemplary embodiment shown in FIG. 1 second bearing 31 is also fashioned as roller bearing 31.

Brake force generator 1 also has a third bearing 35 that transmits a radial force. End 25 of carrier bar 24 lies radially from the inside on a first bearing ring 36 of third bearing 35. First bearing shield 28 lies radially from the outside on a second bearing ring 37 of third bearing 35. A plurality of roller elements 38 are situated between first bearing ring 36 and second bearing ring 37. In this way, according to the exemplary embodiment shown in FIG. 1 third bearing 36 is also fashioned as roller bearing 36.

Figure 2:
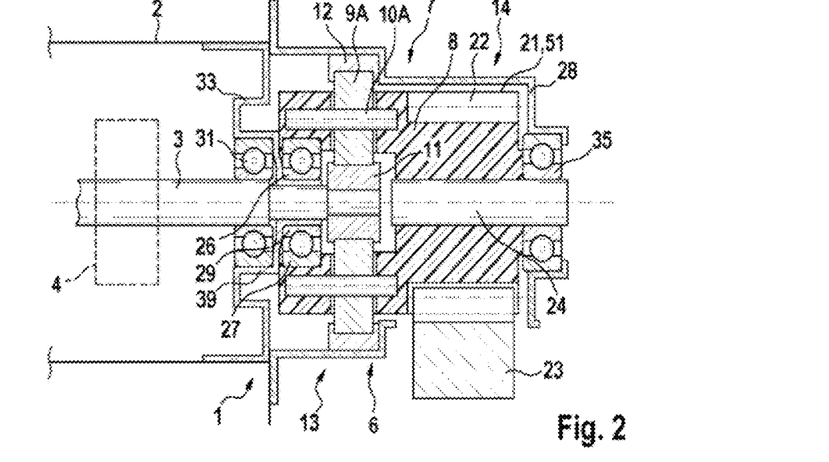
FIG. 2 shows a second exemplary embodiment of the brake force generator, according to the present invention.

FIG. 2 shows brake force generator 1 according to a second exemplary embodiment. Brake force generator 1 shown in FIG. 2 differs from the brake force generator 1 shown in FIG. 1 in particular with regard to the realization of first bearing 26. According to the exemplary embodiment shown in FIG. 2, hollow shaft segment 13 lies radially from the outside on first bearing ring 27 of first bearing 26. Second bearing shield 33 lies radially from the inside on second bearing ring 29 of first bearing 26. Second bearing shield 33 thus on the one hand lies radially from the outside on second bearing ring 34 of second bearing 31, and on the other hand lies radially from the inside on second bearing ring 29 of first bearing 26. For this purpose, a free end segment 39 of second bearing shield 33 has a stepped contour in the region of bearings 26 and 31. According to the exemplary embodiment shown in FIG. 2, first bearing ring 27 forms the outer bearing ring of first bearing 26, and second bearing ring 29 forms the inner bearing ring of first bearing 26.

Figure 3:
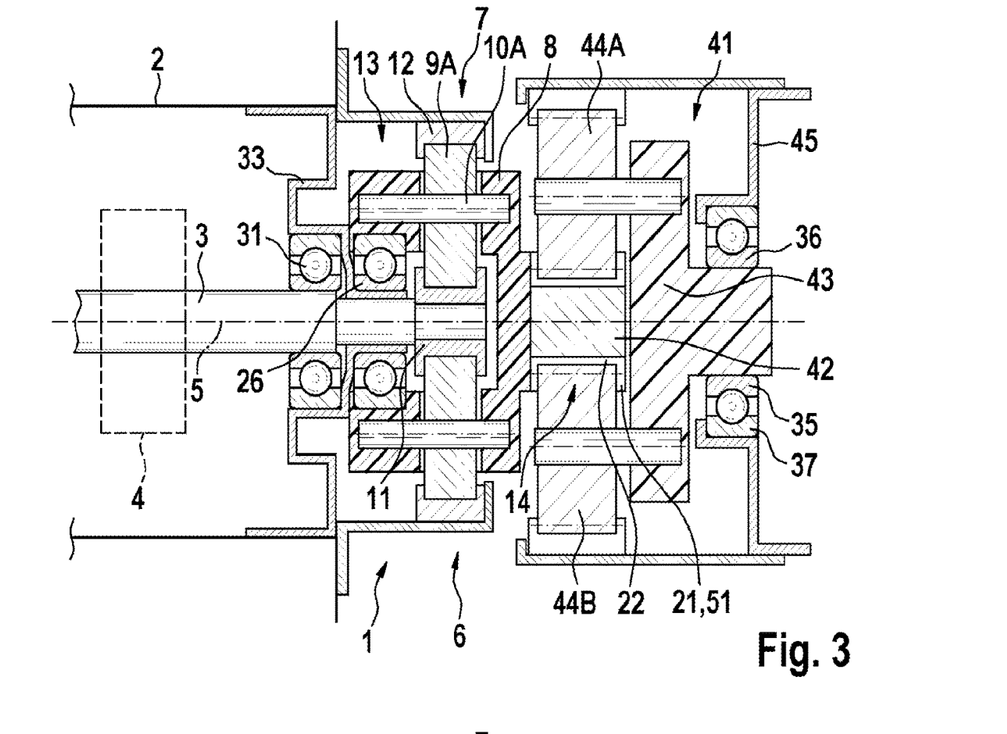
FIG. 3 shows a third exemplary embodiment of the brake force generator, according to the present invention.

FIG. 3 shows brake force generator 1 according to a third exemplary embodiment. Brake force generator 1 shown in FIG. 3 differs from brake force generator 1 shown in FIG. 2 in particular with regard to the realization of the second end region 14 of planet carrier 8. According to the exemplary embodiment shown in FIG. 3, transmission device 6 has a second planetary gear mechanism 41. A second sun gear 42 of second planetary gear mechanism 41 is formed by driven toothing 22 of jacket wall 21 of second end region 14 of planet carrier 8. Second planetary gear mechanism 41 has a second planet carrier 43 that is rotatably mounted. Preferably, second planet carrier 43 is also made of plastic, preferably by injection molding. On second planet carrier 43, three planet gears are rotatably mounted, of which only a fourth planet gear 44A and a fifth planet gear 44B are visible in FIG. 3. According to the exemplary embodiment shown in FIG. 3, second planet carrier 43 lies radially from the inside on first bearing ring 36 of third bearing 35. An additional bearing shield 45, fixed to the housing, lies radially from the outside on second bearing ring 37 of third bearing 35. If the actuating element were shown, then a toothing of the actuating element would for example mesh with a driven toothing of second planet carrier 43. Alternatively, at least one further gear element would be present between the driven toothing of the second planet carrier and the actuating element. In addition, an anti-rotation device would be assigned to the actuating element in order to prevent a rotation of the actuating element.

Figure 4:
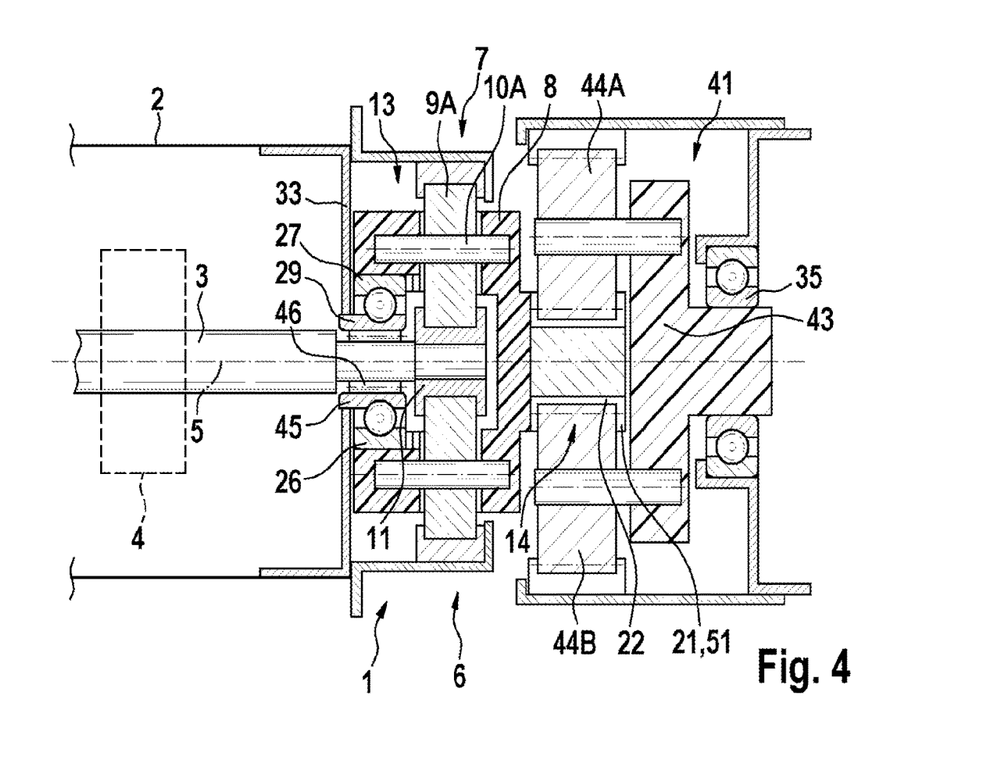
FIG. 4 shows a fourth exemplary embodiment of the brake force generator, according to the present invention.

FIG. 4 shows brake force generator 1 according to a fourth exemplary embodiment. Brake force generator 1 shown in FIG. 4 differs from brake force generator 1 shown in FIG. 3 in particular with regard to the realization of the bearing of driveshaft 3 and the bearing of planet carrier 8. According to the exemplary embodiment shown in FIG. 4, second bearing 31 is omitted. Instead, both planet carrier 8 and driveshaft 3 are rotatably mounted by first bearing 26. Here, first bearing ring 27 forms the outer bearing ring of first bearing 26. Hollow shaft segment 13 lies radially from the outside on first bearing ring 27. Second bearing ring 29 forms the inner bearing ring of first bearing 26. So that second bearing shield 33 can nonetheless lie radially from the outside on second bearing ring 29, second bearing ring 29 has a second axial projection 45 that stands out axially from first bearing 26 in the direction of electric motor 4. Second bearing shield 33 lies radially from the outside on second axial projection 45. Driveshaft 3 lies radially from inside on second bearing ring 29 via a needle cage 46. Alternatively, driveshaft 3 lies radially from the inside on a third bearing ring that then forms the inner bearing ring of first bearing 26, so that second bearing ring 29 forms a center bearing ring of first bearing 26. Usefully, a plurality of roller elements or a sliding medium is then situated between second bearing ring 29 and the third bearing ring.

Figure 5:
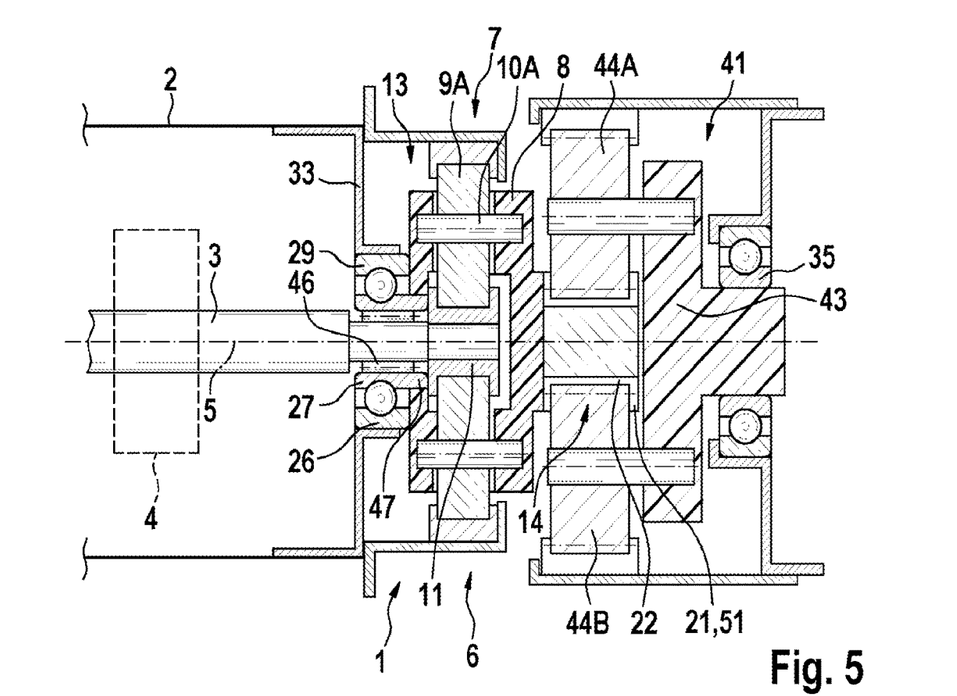
FIG. 5 shows a fifth exemplary embodiment of the brake force generator, according to the present invention.

FIG. 5 shows brake force generator 1 according to a fifth exemplary embodiment. Brake force generator 1 shown in FIG. 5 differs from brake force generator 1 shown in FIG. 4 in particular with regard to the realization of first bearing 26. According to the exemplary embodiment shown in FIG. 5, second bearing ring 29 forms the outer bearing ring of first bearing 26. Second bearing shield 33 lies radially from the outside on second bearing ring 29. First bearing ring 27 forms the inner bearing ring of first bearing 26. So that hollow shaft segment 13 can nonetheless lie radially from the outside on first bearing ring 27, first bearing ring 27 has a first axial projection 47 that stands out axially from first bearing 26 in the direction of planet gears 9. Hollow shaft segment 13 lies radially from the outside on first axial projection 47. Via needle cage 46, driveshaft 3 lies radially from the inside on first bearing ring 27. Alternatively, driveshaft 3 lies radially from the inside on a third bearing ring that then forms the inner bearing ring of first bearing 26, so that first bearing ring 27 forms a center bearing ring of first bearing 26. Usefully, a plurality of roller elements or a sliding medium is then situated between first bearing ring 27 and the third bearing ring.

Figure 6:
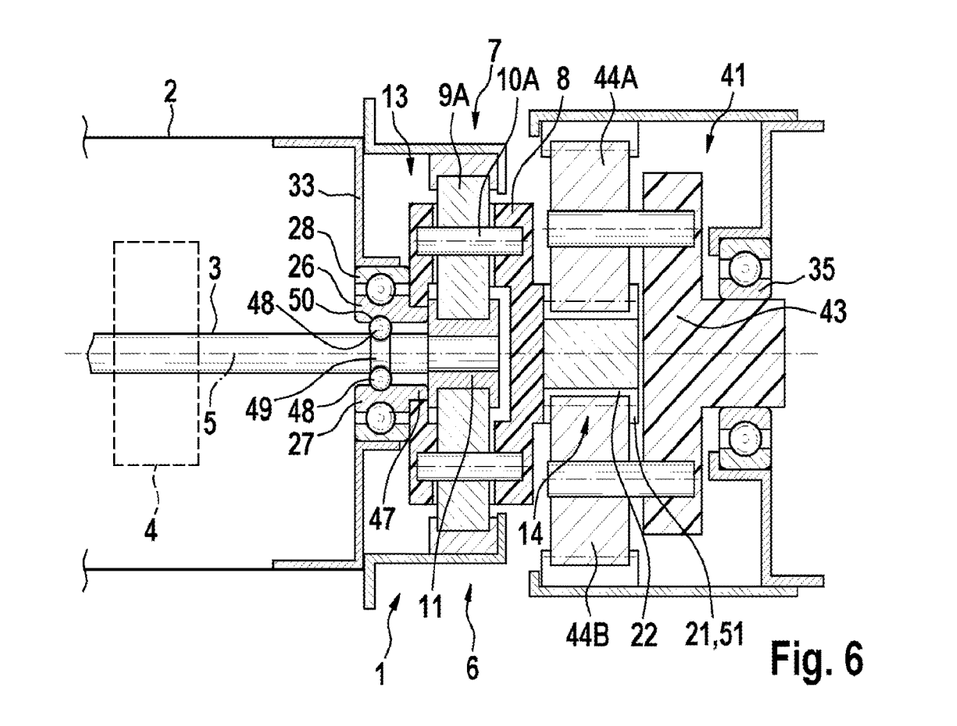
FIG. 6 shows a sixth exemplary embodiment of the brake force generator, according to the present invention.

FIG. 6 shows brake force generator 1 according to a sixth exemplary embodiment. Brake force generator 1 shown in FIG. 6 differs from brake force generator 1 shown in FIG. 5 in that, instead of needle cage 46, as roller element a plurality of balls 48 are provided between driveshaft 3 and first bearing ring 27. Here, driveshaft 3 has a circumferential groove 49.

First bearing ring 27 has a circumferential groove 50 that is situated radially opposite circumferential groove 49. Balls 48 engage radially both in circumferential groove 49 and in circumferential groove 50.

Figure 7:
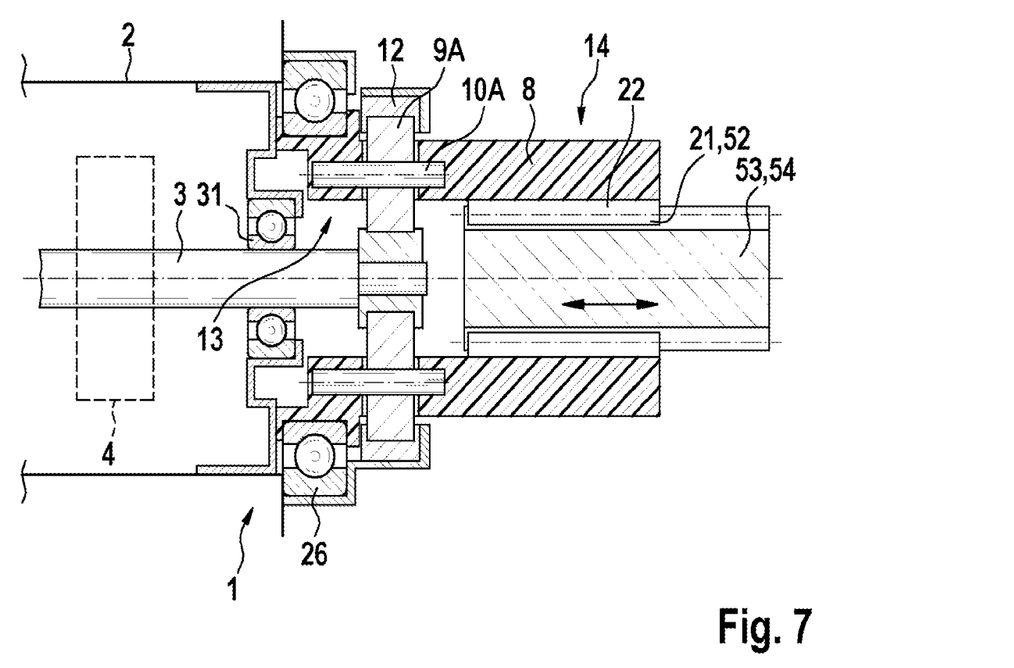
FIG. 7 shows a seventh exemplary embodiment of the brake force generator, according to the present invention.

FIG. 7 shows brake force generator 1 according to a seventh exemplary embodiment. The exemplary embodiment shown in FIG. 7 differs from the exemplary embodiment shown in FIG. 1 in particular with regard to the realization of second end region 14 of planet carrier 8. According to the exemplary embodiment shown in FIG. 7, second end region 14 is fashioned as a hollow shaft. Driven toothing 22 is fashioned in a jacket inner wall 52 of hollow shaft-shaped end region 14. In addition, actuating element 53 is shown in FIG. 7. In the present case, actuating element 53 is a threaded spindle 54 that is screwed into driven toothing 22. An anti-rotation device (not shown) is assigned to threaded spindle 54, so that when there is a rotation of planet carrier 8 threaded spindle 54 does not rotate conjointly with planet carrier 8, but rather is axially displaced.

Figure 8:
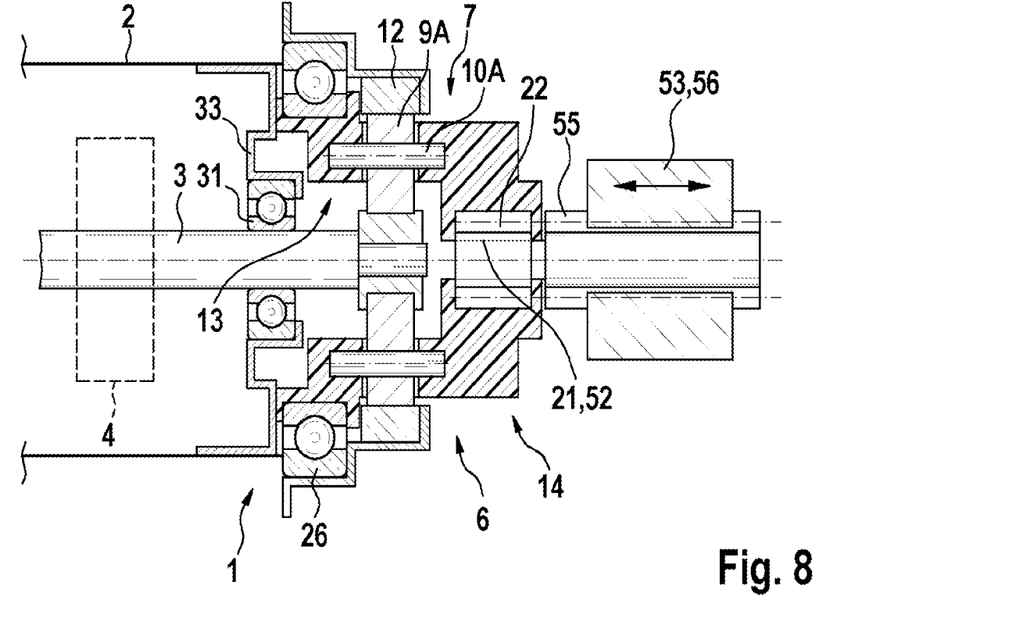
FIG. 8 shows an eighth exemplary embodiment of the brake force generator, according to the present invention.

FIG. 8 shows brake force generator 1 according to an eighth exemplary embodiment. In the exemplary embodiment shown in FIG. 8 as well, second end region 14 is made as a hollow shaft and driven toothing 22 is formed in a jacket inner wall of hollow shaft-shaped end region 14. A threaded spindle 55 is screwed into driven toothing 22. Alternatively, planet carrier 8 is spray-molded onto threaded spindle 55. Actuating element 53 is formed by a threaded nut 56 that is screwed onto threaded spindle 55. An anti-rotation device (not shown) is assigned to threaded nut 56, so that when there is a rotation of planet carrier 8, threaded nut 56 does not rotate conjointly with planet carrier 8, but rather is axially displaced.

What is claimed is:
1. A brake force generator for a braking system, the brake force generator comprising:
    a housing;
    a driveshaft that is rotatably mounted in the housing;
    an electric motor that has a rotor and at least one motor winding, the rotor being situated in rotationally fixed fashion on the driveshaft and being rotatable through an application of current to the motor winding;
    an actuating element;
    a transmission device that includes a planetary gear mechanism, wherein:
        the planetary gear mechanism includes a sun gear, a plurality of planet gears, a rotatable mounted planet carrier, a hollow gear, and an interfacing gear;
        the sun gear is connected in rotationally fixed fashion to the driveshaft;
        the rotatably mounted planet carrier has a radially stepped hollow interior including a first hollow section and a second hollow section;
        the first hollow section is radially wider than the second hollow section;
        the sun gear is arranged within the first hollow section;
        the plurality of planet gears are each rotatably mounted on the planet carrier by a respective one of a plurality of planet gear shafts that are arranged, and extend axially, within respective shaft chambers;
        a radially exterior region of the planet carrier that surrounds the first hollow section forms a jacket wall;
        the shaft chambers extend axially at both axial sides of the planet gears and are formed in the jacket wall at respective circumferential positions of the jacket wall;
        the jacket wall includes at each of the respective circumferential positions a respective radial through-opening in which a respective one of the planet gears lies; and
        the interfacing gear is arranged in communication with a toothing that is formed around an exterior of the planet carrier in a region surrounding the second hollow section;

the hollow gear extends circumferentially around the plurality of planet gears and at least a portion of the jacket wall around the first hollow section of the planet carrier;

the hollow gear is interiorly toothed with gear teeth that communicate with exterior gear teeth of the plurality of planet gears;

a carrier rod that extends, in a direction away from the driveshaft, from within the second hollow section of the planet carrier to out of the planet carrier, wherein the planet carrier is radially supported on a region of the carrier rod that is within the second hollow section of the planet carrier;

a bearing shield within which the sun gear, the plurality of planet gears, the rotatable mounted planet carrier, and the hollow gear are arranged; and a first bearing;

a second bearing; and a third bearing;

wherein:

each of the first, second, and third bearings is formed of a respective inner ring, a respective outer ring, and respective rollers radially sandwiched between the in respective inner and outer rings;

the inner ring of the first bearing is arranged on an exterior of the driveshaft, thereby radially supporting the driveshaft;

the inner ring of the second bearing is arranged on an exterior of the jacket wall;

the exterior ring of the second bearing is supported against an interior of the bearing shield;

an exterior of the hollow gear is supported against the interior of the bearing shield;

the inner ring of the third bearing is supported on a region of the carrier rod that is outside of the planet carrier;

the outer ring of the third bearing is supported against the interior of the bearing shield;

the second bearing is arranged axially between the first and third bearings; and the transmission device is structured and arranged such that, upon rotation of the rotor under influence of the motor winding due to the application of current:

the rotation of the rotor causes the sun gear to rotate;

due to a toothed connection between exterior teeth of the sun gear with the exterior gear teeth of the plurality of planet gears, the rotation of the sun gear causes each of the plurality of planet gears to rotate;

due to the communication of the gear teeth of the hollow gear with the exterior gear teeth of the plurality of planet gears, the rotation of the plurality of planet gears causes:

the plurality of planet gears to revolve around a central rotation axis of the planet carrier; and the planet carrier to rotate around the central rotation axis of the planet carrier;

due to the communication of the interfacing gear with the toothing that is formed around the exterior of the planet carrier, the rotation of the planet carrier causes the interfacing gear to rotate; and the rotation of the interfacing gear causes an axial displacement of the actuating element of the braking system.

2. The brake force generator as recited in claim 1, wherein the planet carrier is made of plastic.

3. The brake force generator as recited in claim 2, wherein the planet carrier is an injection-molded part.

4. The brake force generator as recited in claim 1, wherein the planet gear shaft (a) is connected in rotationally fixed fashion to one of the planet carrier and the planet gear shaft and (b) is rotatable to the other of the planet carrier and the planet gear.

5. The brake force generator as recited in claim 1, wherein the shaft chambers each have a first bearing segment and a second bearing segment, each of the radial through-openings being situated axially between a respective pair of the bearing segments of a respective one of the shaft chambers, the first bearing segment having an axial through-opening, the second bearing segment having an axial recess, and a respective one of the planet gear shafts being mounted partly in the axial through-opening and partly in the axial recess.

6. The brake force generator as recited in claim 5, wherein the planet gear shafts are axially fixed by hot stamping of respective ones of the first bearing segments.

7. The brake force generator as recited in claim 1, wherein the first and second bearings are is situated on a side facing of the planet gears facing the electric motor.

8. The brake force generator as recited in claim 1, wherein the bearing shield is fixed to the housing.

9. The brake force generator as recited in claim 1, wherein the driveshaft is rotatably mounted by the first bearing.

10. The brake force generator as recited in claim 9, wherein the inner ring of the first bearing is arranged on the driveshaft via a sliding medium or via a plurality of roller elements.

11. An actuating device for a brake system, comprising:

a master brake cylinder in which a hydraulic piston is mounted; and an brake force generator including:

a housing;

a driveshaft that is rotatably mounted in the housing;

an electric motor that has a rotor and at least one motor winding, the rotor being situated in rotationally fixed fashion on the driveshaft and being rotatable through an application of current to the motor winding;

an actuating element;

a transmission device that includes a planetary gear mechanism, wherein:

the planetary gear mechanism includes a sun gear, a plurality of planet gears, a rotatable mounted planet carrier, a hollow gear, and an interfacing gear;

the sun gear is connected in rotationally fixed fashion to the driveshaft;

the rotatably mounted planet carrier has a radially stepped hollow interior including a first hollow section and a second hollow section;

the first hollow section is radially wider than the second hollow section;

the sun gear is arranged within the first hollow section;

the plurality of planet gears are each rotatably mounted on the planet carrier by a respective one of a plurality of planet gear shafts that are arranged, and extend axially, within respective shaft chambers;

a radially exterior region of the planet carrier that surrounds the first hollow section forms a jacket wall;

the shaft chambers extend axially at both axial sides of the planet gears and are formed in the jacket wall at respective circumferential positions of the jacket wall;

the jacket wall includes at each of the respective circumferential positions a respective radial through-opening in which a respective one of the planet gears lies; and the interfacing gear is arranged in communication with a toothing that is formed around an exterior of the planet carrier in a region surrounding the second hollow section;

the hollow gear extends circumferentially around the plurality of planet gears and at least a portion of the jacket wall around the first hollow section of the planet carrier;

the hollow gear is interiorly toothed with gear teeth that communicate with exterior gear teeth of the plurality of planet gears;

a carrier rod that extends, in a direction away from the driveshaft, from within the second hollow section of the planet carrier to out of the planet carrier, wherein the planet carrier is radially supported on a region of the carrier rod that is within the second hollow section of the planet carrier;

a bearing shield within which the sun gear, the plurality of planet gears, the rotatable mounted planet carrier, and the hollow gear are arranged; and a first bearing;
a second bearing; and
a third bearing;

wherein:

each of the first, second, and third bearings is formed of a respective inner ring, a respective outer ring, and respective rollers radially sandwiched between the in respective inner and outer rings;

the inner ring of the first bearing is arranged on an exterior of the driveshaft, thereby radially supporting the driveshaft;

the inner ring of the second bearing is arranged on an exterior of the jacket wall;

the exterior ring of the second bearing is supported against an interior of the bearing shield;

an exterior of the hollow gear is supported against the interior of the bearing shield;

the inner ring of the third bearing is supported on a region of the carrier rod that is outside of the planet carrier;

the outer ring of the third bearing is supported against the interior of the bearing shield;

the second bearing is arranged axially between the first and third bearings; and the transmission device is structured and arranged such that, upon rotation of the rotor under influence of the motor winding due to the application of current:

the rotation of the rotor causes the sun gear to rotate;

due to a toothed connection between exterior teeth of the sun gear with the exterior gear teeth of the plurality of planet gears, the rotation of the sun gear causes each of the plurality of planet gears to rotate;

due to the communication of the gear teeth of the hollow gear with the exterior gear teeth of the plurality of planet gears, the rotation of the plurality of planet gears causes:

the plurality of planet gears to revolve around a central rotation axis of the planet carrier; and the planet carrier to rotate around the central rotation axis of the planet carrier;

due to the communication of the interfacing gear with the toothing that is formed around the exterior of the planet carrier, the rotation of the planet carrier causes the interfacing gear to rotate;

the rotation of the interfacing gear causes an axial displacement of the actuating element of the braking system; and the axial displacement of the actuating element displaces the hydraulic piston.

\* \* \* \* \*